United States Patent [19]
Stockton et al.

[11] 3,819,873
[45] June 25, 1974

[54] TELEPHONE CALL INDICATOR

[75] Inventors: Richard B. Stockton, 27 Thorndell, St. Louis County, Mo. 63124; Roger A. Hunter, Brighton, Ill.; Milton G. Croy, Lemay, Mo.

[73] Assignee: said Stockton, by said Croy and Hunter

[22] Filed: May 2, 1972

[21] Appl. No.: 249,529

[52] U.S. Cl. ............ 179/84 L, 179/84 C, 179/81 C
[51] Int. Cl. ........................ H04m 1/26, H04m 1/00
[58] Field of Search .... 179/84 C, 84 L, 81 C, 81 R, 179/84 R

[56] References Cited

UNITED STATES PATENTS

| | | | |
|---|---|---|---|
| 3,226,489 | 12/1965 | Grambsch | 179/84 C |
| 3,320,368 | 5/1967 | Applebaum | 179/84 C |
| 3,322,903 | 5/1967 | Chapin | 179/84 L |
| 3,585,303 | 6/1971 | Chieffo | 179/84 L |

*Primary Examiner*—William C. Cooper
*Assistant Examiner*—Alan Faber
*Attorney, Agent, or Firm*—Ralph W. Kalish

[57] ABSTRACT

A telephone call indicator comprising an induction pickup coil for receiving a signal from a telephone set, means for amplifying said signal, a normally open latching switch in circuit with a visual signal and a power supply, and means for applying the amplified signal for closing said latching switch to effect energization of said visual signal, and a manually operated switch for resetting the device.

1 Claim, 2 Drawing Figures

PATENTED JUN 25 1974 3,819,873

TELEPHONE CALL INDICATOR

BACKGROUND AND SUMMARY OF THE INVENTION

This invention relates in general to visual signaling systems, and more particularly, to a telephone call indicator.

The utilization of answering services by individuals and concerns is currently a matter of common practice. However, heretofore individuals utilizing such system are customarily obligated to call the answering service upon their return to discover whether any calls have been received during their absence. Oftentimes such individuals with concern about other matters may overlook making such inquiring call and thus inadvertently deprive themselves of advice as to the reception of telephone messages which may well be of relative importance.

Therefore, it is an object of the present invention to provide a telephone call indicator which is adapted to activate a visual signal upon ringing of the telephone and with means for maintaining said signal in such activated state until the user through appropriate means extinguishes same.

It is accordingly a further object of the present invention to provide a telephone indicator which provides an arresting, visual signal to the individual for informing as to the ringing of the telephone during the individual's absence and hence of the necessity to call the answering service for advice.

It is a further object of the present invention to provide an indicator of the character stated, the use of which conduces to preventing an individual from accidentally failing to check with an answering service upon termination of the particular interval during which such service was required.

It is a still further object of the present invention to provide a telephone call indicator of the type stated which may be used with any existing telephones and the installation of which does not involve any structural modification whatever of the associated telephone so that no damage is caused same. The indicator at all times remains independent of the telephone.

It is a further object of the present invention to provide a telephone call indicator which incorporates novel means for preventing activation of the indicator by spurious signals.

It is a still further object of the present invention to provide a telephone call indicator, the use of which obviates the necessity of the user from calling the answering service if no incoming calls have been received.

It is another object of the present invention to provide a telephone call indicator which may be most economically manufactured, being amenable to high volume, low-cost production; which may be easily used by the average home owner so that no special skills are needed for placing in operative condition; and which is durable and reliable in usage.

DESCRIPTION OF THE PREFERRED EMBODIMENT

Figures 1, 2:
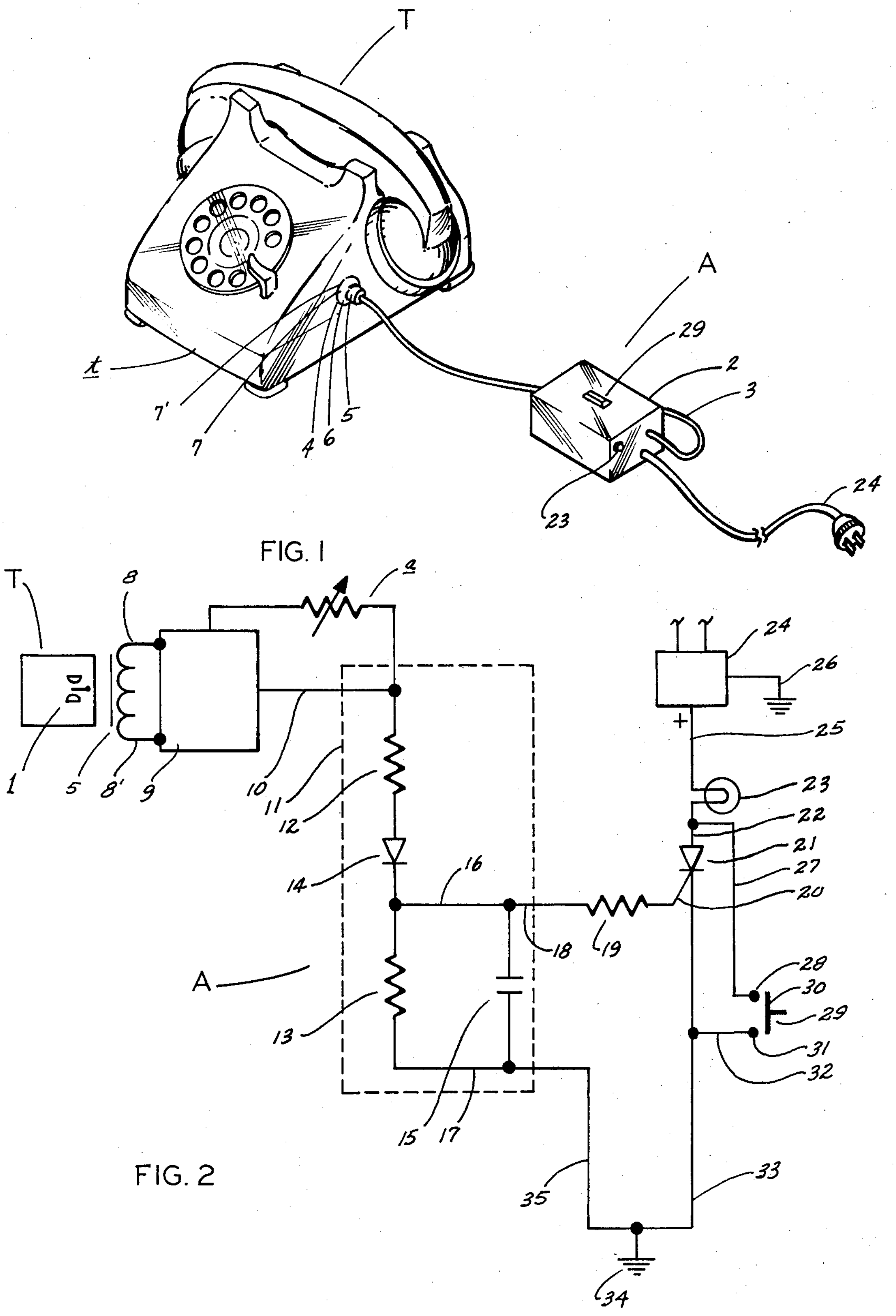
FIG. 1 is a perspective view of a telephone call indicator constructed in accordance with and embodying the present invention, illustrating same in operative disposition with respect to a telephone.
FIG. 2 is a wiring diagram.

Referring now by reference characters to the drawings which illustrate preferred embodiment of the present invention, A generally designates a call indicator for use with a telephone set, as indicated at T, which is of conventional character which incorporates the customary means for causing an aural signal or so-called "ringing" as by an electric switch, as broadly designated at 1; said means produce simultaneously with the aural signal an electromagnetic disturbance in the general vicinity of said telephone set. Indicator A comprises a relatively small volume housing 2, which may be disposed at any convenient location, but preferably in relative proximity to telephone T; it being noted that the same is an integrated device which need not be fixed in any way to telephone T so that inadvertent damage to telephone T is obviated. Extending through an opening in one side wall of housing 2 is a cable 3, which at its outer end extremity, embodies a housing portion 4 for receiving an induction coil or induction pickup 5 and with said housing 4 extending marginally in a flared manner, as at 6, to define a suction cup 7 having a feathered peripheral edge, as at 7', so that said cup 7 may be applied to the exterior face of housing *t* of telephone T with a light force, but yet providing a close tight seal. The area of application will be upon the body of telephone set T so that coil 5 will be disposed for receiving the signal generated by said switch 1 upon telephone "ringing," it being recognized that the signal will be of relatively low amplitude, as measured in millivolts. Suction cup 7 provides the only physical interconnection between indicator A and telephone T; which connection is entirely harmless to telephone T and adapted for facile removal and engagement. The length of cable 3 will thus effectively control the relative location of indicator A. It is, of course, understood that connection between indicator A and telephone T for disposing coil 5 for reception of a signal from switch 1 may be effected in numerous other manners, all within the competency of one skilled in the art. However, the utilization of the suction cup 7 is preferred for obvious reasons.

Referring now to FIG. 2 it will be seen that coil 5 is connected by leads 8,8' encased within cable 3, to an operational amplifier 9 which is of generally conventional type containing the usual biasing arrangement and customary overload protection. A veriable feedback resistor or potentiometer *a* is provided to adjust the gain of amplifier 9 to make indicator A compatible with substantially all current telephone sets.

The output of amplifier 9 is in circuit by means of a lead 10 with a voltage divider and timing circuit unit 11, as indicated by the phantom line; which unit comprises resistors 12, 13 in series with an intervening rectifier 14 and a capacitor 15 in parallel with resistor 13 by conductors 16, 17. The voltage appearing across capacitor 15 is applied through a lead 18 and a feedthrough resistor 19 to the gate lead 20 of a latching switch 21 of the type commonly referred to as a silicon controlled rectified (SCR). Switch 21 is connected in series through a conductor 22 with a visual signal 23 as of the filament type, which latter is engaged to the positive output side of a power supply 24 by a conductor 25. Power supply 24 is of conventional type being adapted for connection to the usual 115 volt AC wall outlets, embodying a rectifier together with requisite filters, voltage regulators, a voltage divider, all as well known in the art to produce a positive DC voltage, as well as to provide positive and negative bias for operation of amplifier 9 in the usual fashion, and provides a reference ground, as indicated at 26.

Progressing from lead 22 between latching switch 21 and visual signal 23 is a conductor 27, the opposite end of which is fixed to a terminal or contact 28 of a manually operated reset switch 29, which latter is provided with a controller 30. Said switch 29 also embodies a second terminal, or contact 31, connected by a lead 32 to a conductor 33 extending between latching switch 21 and a ground at 34, which is also connected to conductor 17 by a lead 35. Reset switch 29 is normally open, being suitably spring biased. Upon closing of contacts 28,31 by controller 30, latching switch 21 is shorted, that is with the circuit by-passing same to illuminate visual signal 23, and thereby turn "off" latching switch 21. Thus, in the "off" position, said latching switch 21 is open thereby resetting the system for the next operation. Upon release of controller 30 visual signal 23 will be extinguished and thus poise the system for the next cycle.

Referring now primarily to FIG. 2, the operation of indicator A will be described. Upon energization of switch 1 of telephone T, the associated electromagnetic disturbance will produce a small voltage signal for reception by coil 5 and which signal is amplified by operational amplifier 9 to, conceivably, a few volts which are directed to voltage divider and timing circuit 11, with signal rectification by rectifier 14 and with the voltage being applied through lead 16 to capacitor 15. As the telephone "ringing" continues, a voltage buildup will be effected by capacitor 15 until the same reaches the level necessary to trigger latching switch 21, the same requiring a time which is determined by appropriate choice of resistance of resistor 12 and capacitance of capacitor 15. With switch 21 closed, as by application of requisite trigger voltage, a current path is established from power supply 24 through lead 25, visual signal 23 and thence to ground 34 via conductor 33. Such current will cause illumination of visual signal 23 and which will remain in such state until reset switch 29 is operated by closing and then releasing with resultant opening of latching switch 21 as above described.

Reset switch 29 also serves to determine the condition of the system, since by pushing controller 30 illumination of visual signal 23 will indicate the operative character of the system.

In view of the foregoing, it will be seen that the signal received from telephone switch 1 is the source of the voltage for triggering latching switch 21 so that upon the latter being closed a current path is then established with power supply 24 to provide the current for energizing signal 23.

From a user's standpoint, subsequent to installation, the only action required is with respect to reset switch 29 for closing same to determine if signal 23 is in appropriate condition. In actual use upon noting energization of signal 23, as by illumination, the user is informed that in his absence or without his awareness, a call has been attempted on telephone T. The user thereupon contacts his answering service to learn of the source of such call. Had there been more than one call in the user's absence, the service would fully inform him since the maintenance of signal 23 in illuminated state indicates that at least one call had been attempted. As developed above, to extinguish signal 23 and return indicator A to ready state, switch 29 is momentarily closed and then opened.

The voltage divider and timing circuit unit 11 uniquely assures that signal 23 will be illuminated only as a result of the actuation of telephone switch 1 thereby preventing spurious signals as received from random causes such as lightning, vehicle movement, etc., from activating signas 23. Despite the sensitivity of induction coil 5 to reception of any ambient signal, the capacity of capacitor 15 and the resistance of resistors 12,13 are so selected that requisite voltage for triggering latching switch 21 must be applied for a predetermined time interval such as the time of one "ring" period of telephone set T. Thus, a voltage buildup over such period must be effected so that single relatively high voltage applications or repeated charging over a relatively greater interval will be insufficient for operating purposes. A sustained signal is required to charge capacitor 15 and fire switch 21. Random signals will be bled from capacitor 15 through resistor 13 before gating voltage is achieved so that spurious signals are thereby dissipated.

The said unit 11 thereby conduces to the marked reliability of indicator A and obviates false energization of signal 23.

Although latching switch 21 has been described hereinabove as being a silicon controlled rectifier, it is to be understood that other solid state semi-conductors may be utilized, such as, for example, a PNPN transistor.

Having thus described our invention, what we claim and desire to obtain Letters Patent for is:

1. Telephone call indicator apparatus for use with a telephone, said apparatus comprising an induction coil for receiving an electromagnetic telephone ringing signal, a suction cup engaging said induction coil to said telephone, means for amplifying the received ringing signal, a normally nonconductive triggerable silicon controlled rectifier which is triggerable for becoming conductive and remaining conductive, a visual signalling device connected in a circuit with said silicon controlled rectifier for signalling when said silicon controlled rectifier is conductive, said signalling device including a filament connected in a series circuit with main electrodes of said silicon controlled rectifier across a power source, triggering circuit means for supplying the amplified ringing signal to said silicon controlled rectifier for triggering thereof thereby to cause said signalling device to provide continuing signalling indicative that there has been ringing of said telephone, said triggering circuit means comprising a resistive-capacitive timing circuit including a capacitor adapted for being charged through a resistor by said amplified ringing signal to a voltage sufficient for triggering said silicon controlled rectifier, said apparatus further comprising a reset switch also connected in said series circuit, said switch being manually operable for opening said series circuit to render said silicon controlled rectifier nonconductive, and a housing exclusive of said telephone for enclosing said amplifying means, said silicon controlled rectifier, said signalling device, and said triggering circuit means.

* * * * *